(12) United States Patent
Voss et al.

(10) Patent No.: US 7,367,881 B2
(45) Date of Patent: May 6, 2008

(54) HIGH CAPACITY COMBINE GRAIN BIN UNLOAD SYSTEM

(75) Inventors: Douglas A. Voss, Wichita, KS (US); Chris F. Halfman, Newton, KS (US)

(73) Assignee: AGCO Corporation, Duluth, GA (US)

( * ) Notice: Subject to any disclaimer, the term of this patent is extended or adjusted under 35 U.S.C. 154(b) by 6 days.

(21) Appl. No.: 11/351,386

(22) Filed: Feb. 10, 2006

(65) Prior Publication Data

US 2007/0191080 A1    Aug. 16, 2007

(51) Int. Cl.
*A01D 17/02* (2006.01)
*A01F 12/46* (2006.01)

(52) U.S. Cl. ..................... 460/114; 414/526

(58) Field of Classification Search ........... 460/114, 460/103, 119; 56/14.6; 414/526, 523, 505, 414/502, 519; 198/668, 672, 536, 671, 674
See application file for complete search history.

(56) References Cited

U.S. PATENT DOCUMENTS

| | | | | |
|---|---|---|---|---|
| 2,772,767 A | * | 12/1956 | Seifert | 198/632 |
| 2,883,076 A | * | 4/1959 | Palmer | 414/526 |
| 3,241,657 A | * | 3/1966 | Buschbom | 198/550.6 |
| 3,337,068 A | * | 8/1967 | Meharry | 414/523 |
| 3,460,698 A | * | 8/1969 | Harris | 414/502 |
| 3,477,599 A | * | 11/1969 | De Coene | 414/502 |
| 3,550,793 A | * | 12/1970 | Garner et al. | 414/523 |
| 3,664,525 A | | 5/1972 | Herbsthofer | |
| 3,669,291 A | | 6/1972 | De Coene | |
| 3,670,913 A | | 6/1972 | Reaves | |
| 3,938,684 A | | 2/1976 | Quoiffy et al. | |
| 4,037,745 A | | 7/1977 | Hengen et al. | |
| 4,274,790 A | | 6/1981 | Barker | |
| 4,427,105 A | * | 1/1984 | Hawley et al. | 198/632 |
| 4,662,812 A | | 5/1987 | Busboom et al. | |
| 4,846,621 A | * | 7/1989 | Warsaw | 414/526 |
| 5,013,208 A | * | 5/1991 | Grieshop | 414/526 |
| 5,100,281 A | * | 3/1992 | Grieshop | 414/526 |
| 5,137,495 A | | 8/1992 | Luebke | |
| 5,340,265 A | * | 8/1994 | Grieshop | 414/526 |
| 5,538,388 A | | 7/1996 | Bergkamp et al. | |
| 5,695,398 A | | 12/1997 | Carlson et al. | |
| 5,695,399 A | | 12/1997 | Carlson et al. | |
| 5,733,094 A | | 3/1998 | Bergkamp et al. | |

(Continued)

*Primary Examiner*—Árpád Fábián Kovács
(74) *Attorney, Agent, or Firm*—Hovey Williams LLP

(57) ABSTRACT

The grain holding bin of a combine harvester can be rapidly unloaded either on-the-go or at a standstill by an inclined unloading conveyor having its intake end at a low point in the bin adjacent the far side of the bin. The unloading conveyor extends gradually upwardly and outwardly in a straight line from its intake end to a point above and beyond the opposite side of the bin to provide a straight, unrestricted run for grain being unloaded without twists, turns and significant breaks in auger flighting. The outer end of the unloading conveyor can be pivoted back into a rearwardly extending transport position about a simple generally upright pivot hinge. The driving connection between inner and outer portions of the interior auger of the unloading conveyor is automatically re-established as the outer section of the unloading conveyor is returned to its unloading position, notwithstanding the fact that the unsupported inner end of the outer auger section drops slightly out of concentricity with its surrounding tubular housing when the outer conveyor section is in its transport position.

13 Claims, 13 Drawing Sheets

U.S. PATENT DOCUMENTS

| | | |
|---|---|---|
| 5,773,094 A | 6/1998 | Kruckel |
| 6,261,050 B1 * | 7/2001 | Kuhns .................. 414/526 |
| 6,358,143 B1 | 3/2002 | Hurlburt |
| 6,367,234 B1 | 4/2002 | Hurlburt |
| 6,422,376 B1 * | 7/2002 | Nichols et al. ........... 198/668 |
| 6,743,093 B1 | 6/2004 | Pope et al. |
| 6,767,174 B2 * | 7/2004 | Cresswell .............. 414/523 |
| 6,776,569 B1 | 8/2004 | McMahon et al. |
| 6,908,380 B2 | 6/2005 | Silver |
| 7,168,554 B2 * | 1/2007 | Brandt .................. 198/668 |
| 2003/0139208 A1 | 7/2003 | Silver |
| 2004/0139208 A1 | 7/2004 | Tull |
| 2004/0179929 A1 | 9/2004 | Van Mill |
| 2004/0184905 A1 | 9/2004 | Kinzenbaw et al. |

\* cited by examiner

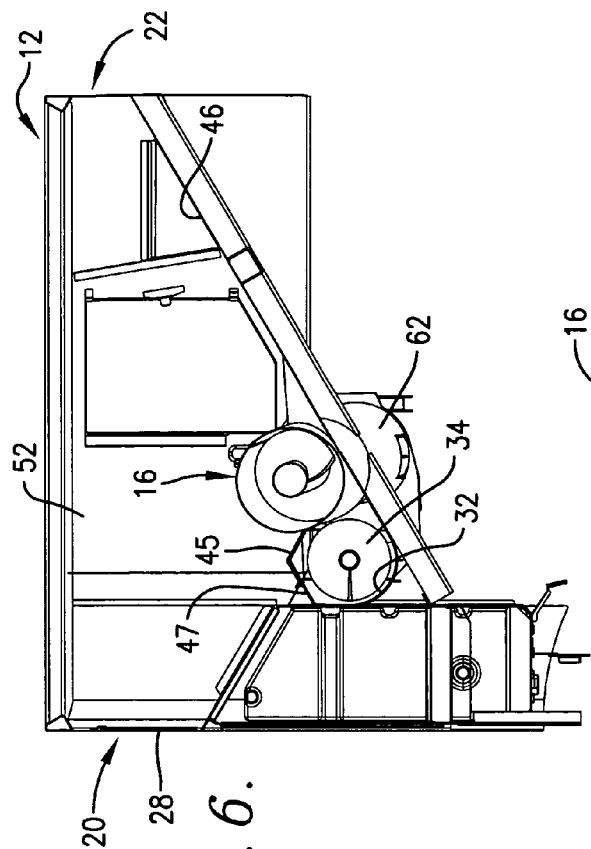
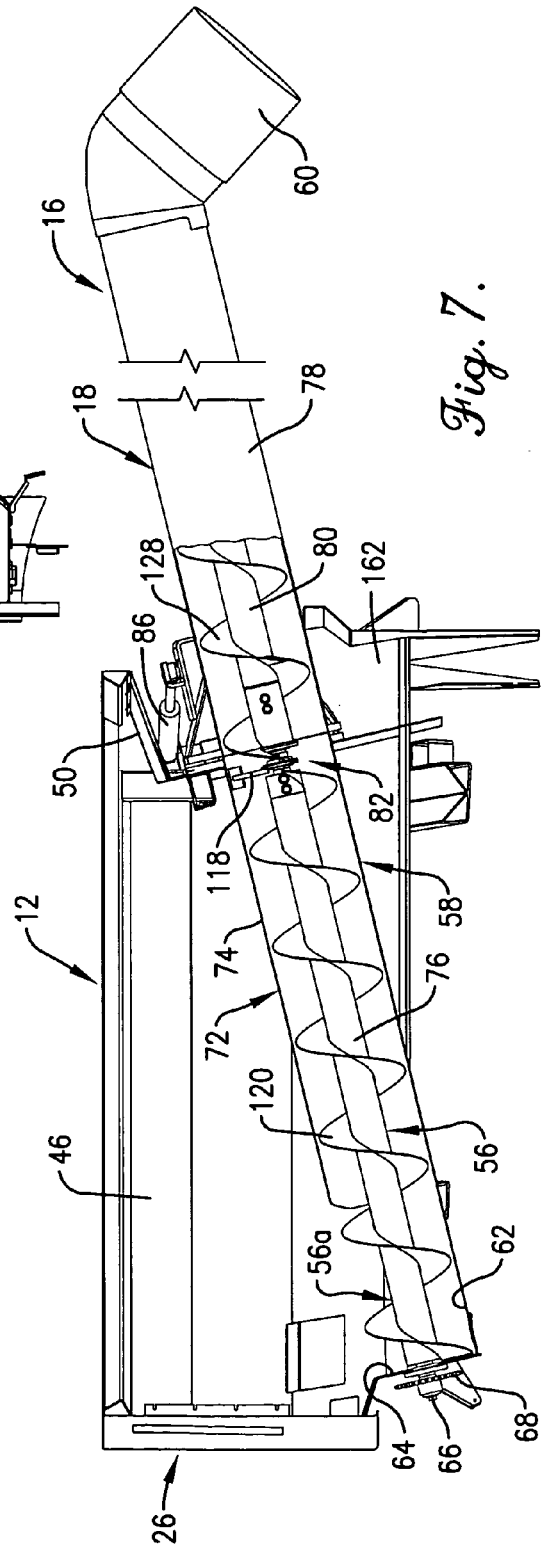

"HIGH CAPACITY COMBINE GRAIN BIN UNLOAD SYSTEM"

TECHNICAL FIELD

This invention relates to combine harvesters and, more particularly, to the grain bin unloading systems of such machines.

BACKGROUND AND SUMMARY

It is well known in the art to provide unloading conveyors for the grain holding bins of combine harvesters so as to permit such machines to be unloaded either on-the-go or at a standstill into trucks or other receptacles. As combine harvesters get larger and larger, however, the holding capacity of their bins likewise increases. In order to retain reasonable unload time, the unload rate must increase to keep pace with the increased storage capacity.

One complicating factor is that most existing combine bin unload systems are of the turret or swivel type which permits an outer portion of the unloading conveyor to be rotated or swung between unloading and transport positions. In such systems, there is an energy loss at the turret or swivel elbow due to the significant gap in auger flights necessitated by abrupt changes in auger directions. This results in restricted flow and increased power requirements, limiting the unloading rate.

The present invention provides a way of overcoming the drawbacks in conventional systems to achieve increased unloading rates while still permitting the unloading conveyor to be folded out of its unloading position into a compacted position for transport. The invention also provides a way of automatically re-establishing the drive connection between sections of the foldable unloading auger as the out-of-alignment, folded section of the auger is returned from its transport position to its unloading position.

BRIEF DESCRIPTION OF THE DRAWINGS

FIG. 6 is a transverse cross-sectional view through the grain bin taken generally along the fore-and-aft line 6-6 of FIG. 5;

FIG. 7 is a transverse cross-sectional view of the grain bin with the outer section of the unloading conveyor in its unloading position and taken substantially along line 7-7 of FIG. 5;

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. References hereinafter made to certain directions, such as, for example, "front", "rear", "left" and "right", are made as viewed from the rear of the harvester looking forwardly.

Figure 1:
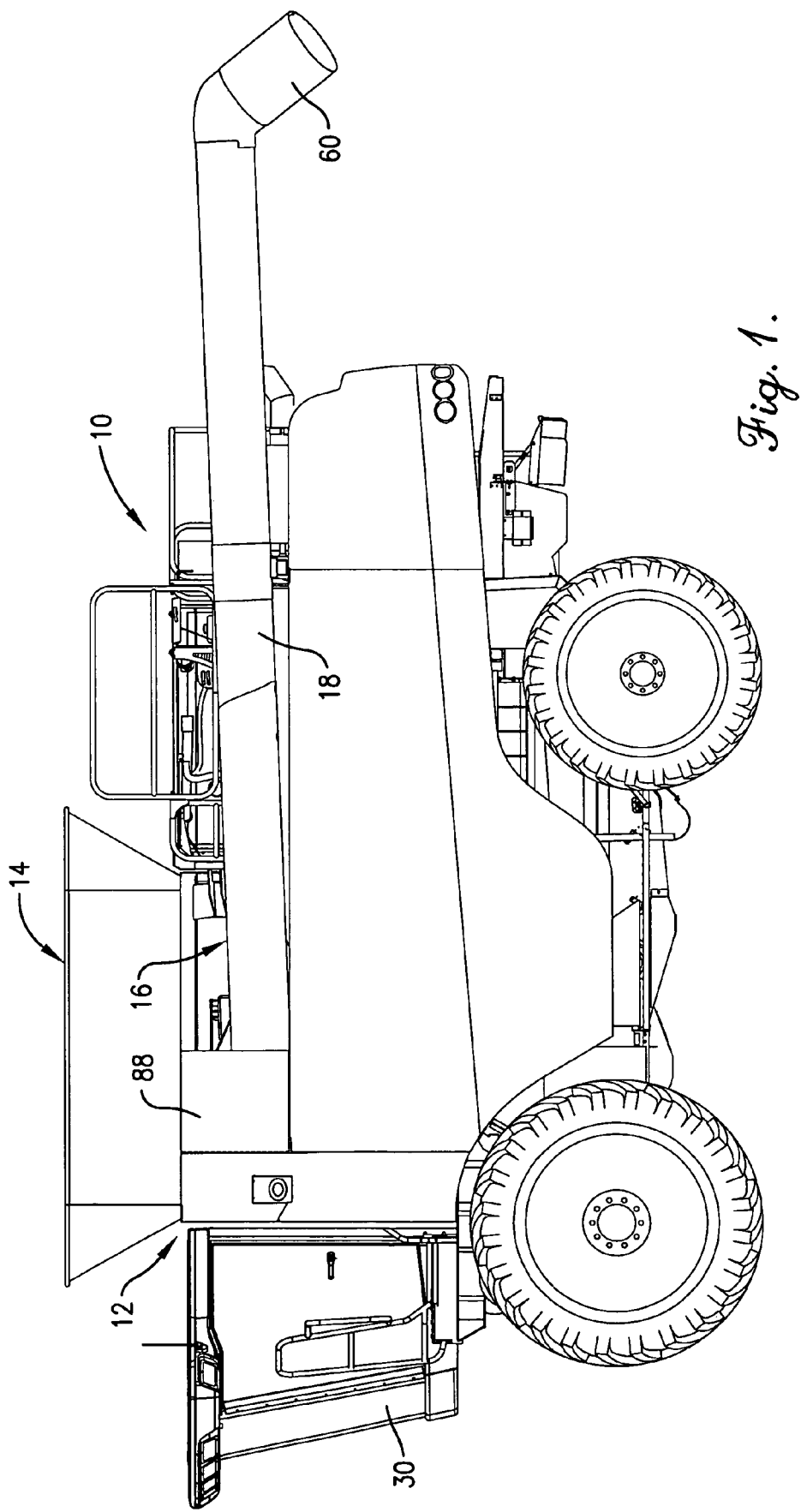
FIG. 1 is a side elevational view of a combine harvester incorporating the principles of the present invention and showing the outer section of the unloading conveyor in its folded back, transport position.

The combine harvester 10 in FIG. 1 has a grain holding bin 12 provided with downwardly converging, hopper-like extensions 14 that provide extra holding capacity for bin 12. Grain that has been threshed, separated and cleaned by internal mechanism (not shown) of the harvester 10 is elevated and temporarily stored in bin 12 until unloaded either on-the-go or at a standstill into a selected receptacle. On-the-go unloading is directed into a receptable that travels alongside harvester 10 while harvesting operations continue to be carried out. An unloading conveyor broadly denoted by the numeral 16 is utilized for this purpose and includes an outer section 18 that is shown folded back into its transport position in FIG. 1.

With particular reference to FIGS. 2-8, it will be seen that in the particular illustrated embodiment bin 12 is open at the top and has a front 20, a rear 22, a left side 24, and a right side 26. A window 28 in front 20 permits the operator seated in the cab 30 (FIG. 1) to observe the condition of bin 12.

Bin 12 has a transverse auger trough 32 in the lower region thereof extending from left side 24 toward right side 26 and terminating a short distance inboard of the latter. A cross auger 34 is disposed within trough 32 and is rotated in such a direction as to feed grain toward right side 26. Input power for driving cross auger 34 is supplied by a sprocket 36 on the left end of auger 34 which is entrained by a drive chain 38 looped around a smaller sprocket 40 on a jack shaft 42 having a double sheave 44 at its opposite end. Sheave 44 is wrapped by endless belts (not shown) that are operably coupled with a source of driving power from the engine of the harvester 10. As illustrated particularly in FIG. 5, cross auger 34 has an adjustable partial cover 45 along the length thereof that leaves cross auger 34 partially exposed at the top for receiving grain through an elongated, adjustable width opening 47.

Bin 12 is provided with a number of inclined surfaces that encourage grain to gravitate downwardly into trough 32 to be acted upon by cross auger 34. In this regard a rear floor 46 slopes downwardly and forwardly from rear side 22 adjacent the upper extremity thereof to a point just below trough 32 of cross auger 34. Similarly, a front floor 48, considerably shorter in length than rear floor 46, extends downwardly and rearwardly from a point just below window 28 to a rearmost point at the forward extremity of trough 32. Left side 24 has an uppermost, downwardly and inwardly inclined panel 50 extending from rear side 22 to front side 20. Panel 50 terminates a short distance inwardly from the upper extremity of left side 24. Right side 26 has an upright sidewall 52 without sloping portions, while left side 24 likewise has an upright sidewall 54 disposed below sloping panel 50 and recessed inwardly with respect to the outermost extremity of panel 50. As illustrated only in FIGS. 2 and 3, a bin fill auger 56 (removed from the other figures for clarity) is provided within bin 12 for delivering clean grain from lower regions of the harvester 10 up into bin 12 to fill the latter.

In a preferred form of the invention, unloading conveyor 16 comprises a hinging auger assembly having an inner portion disposed within bin 12 and an outer portion disposed outside of bin 12. The auger assembly as a whole includes a two-part unloading auger 56 housed within a surrounding, hinged auger tube 58. A downturned discharge spout 60 is provided at the outermost end of tube 58. At the lower, intake end of unloading conveyor 16, auger tube 58 terminates short of the proximal end of auger 56 so as to expose an intake portion 56a of auger 56 as illustrated particularly in FIGS. 4, 5 and 8. A sump 62 at the intersection of inclined rear floor 46 and cross auger trough 32 generally adjacent right side 26 presents a low point within bin 12 that receives the intake end 56a of auger 56. Sump 62 is disposed immediately beside the delivery end of cross auger 34 in open communication therewith for receiving grain from cross auger 34.

Figure 8:
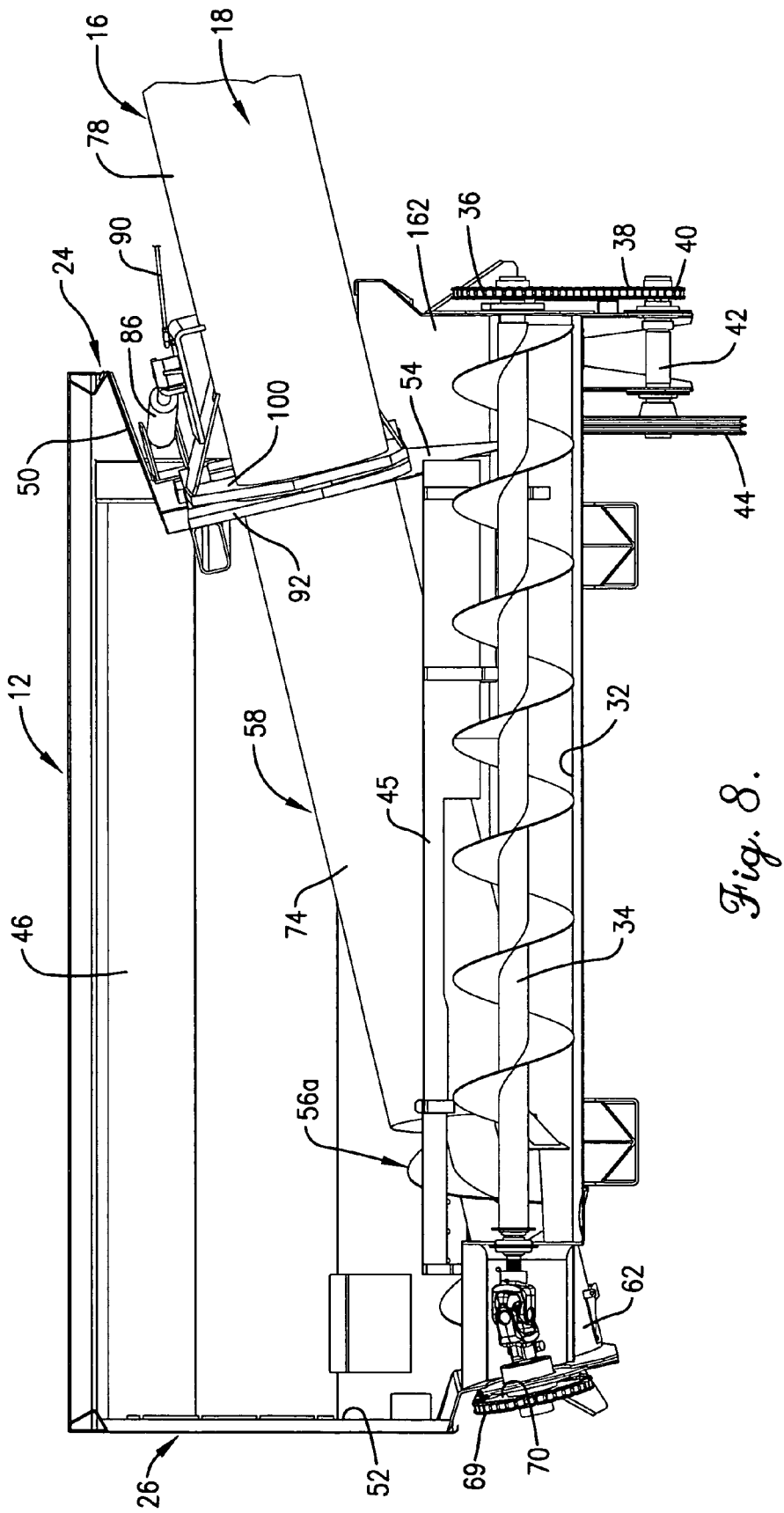
FIG. 8 is a transverse cross-sectional view through the grain bin similar to FIG. 7 but taken along line 8-8 of FIG. 5.

As illustrated in FIG. 7, sump 62 is defined in part by a downwardly and inwardly inclined wall 64 serving as an extension of sidewall 52 in that area. A stub shaft 66 of auger 56 projects through sump wall 64 and carries a sprocket 68 that is drivingly connected by a chain 69 with a sprocket 70 drivingly coupled with the outer end of cross auger 34 as illustrated in FIG. 8.

The two-part unloading conveyor 16 includes foldable outer conveyor section 18 as previously described, as well as a fixed inner conveyor section 72. Inner conveyor section 72 includes an inner section 74 of auger tube 58, as well as an inner section 76 of auger 56. Similarly, outer conveyor section 18 includes an outer section 78 of auger tube 58 and an outer section 80 of auger 56. Inner and outer auger sections 76, 80 are operably interconnected by a releasable drive coupling 82, the details of which will subsequently be described.

Figure 2:
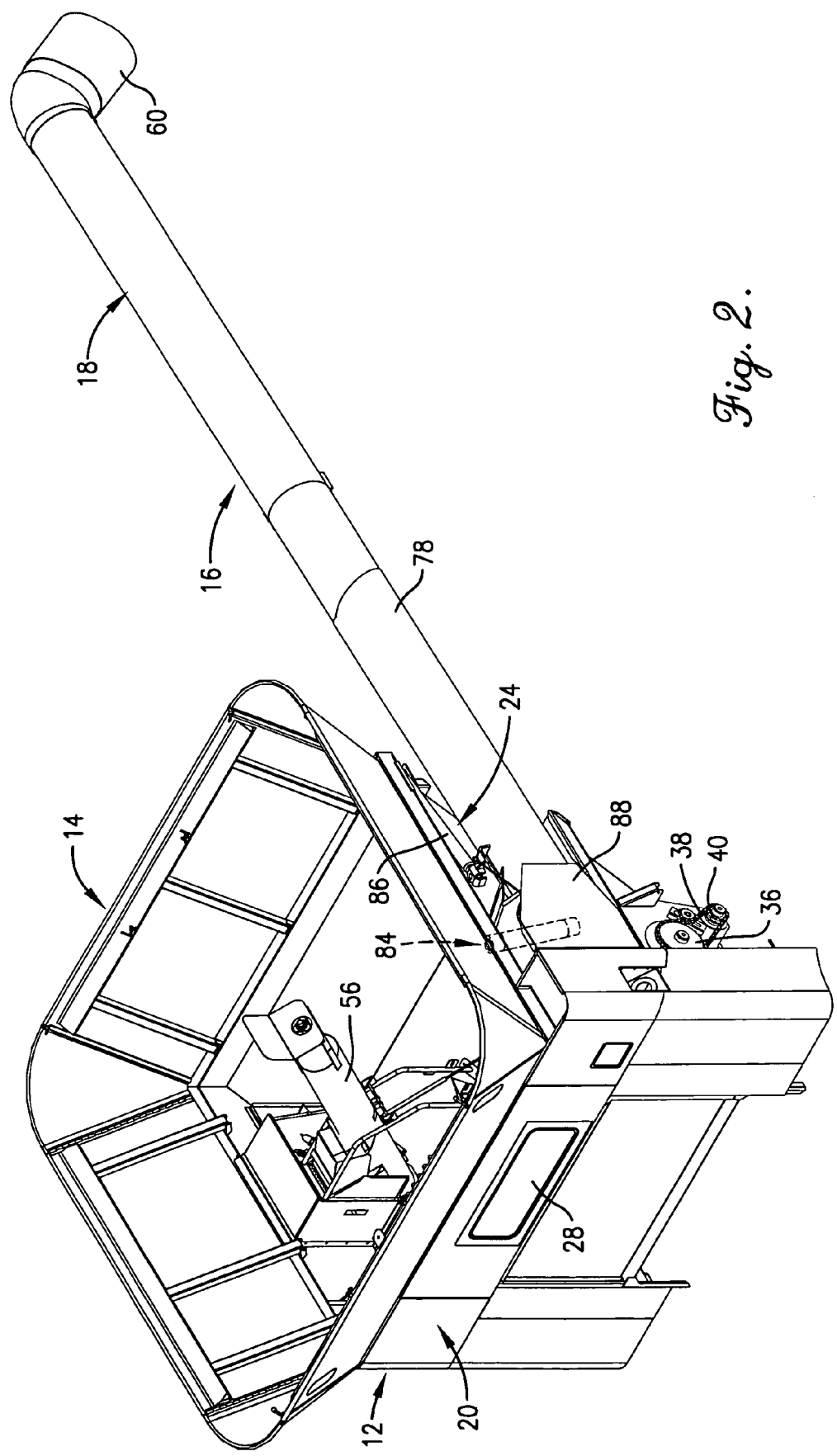
FIG. 2 is a fragmentary, left, front, top isometric view of the grain bin of the harvester with the outer section of the unloading conveyor in its transport position.
Figure 3:
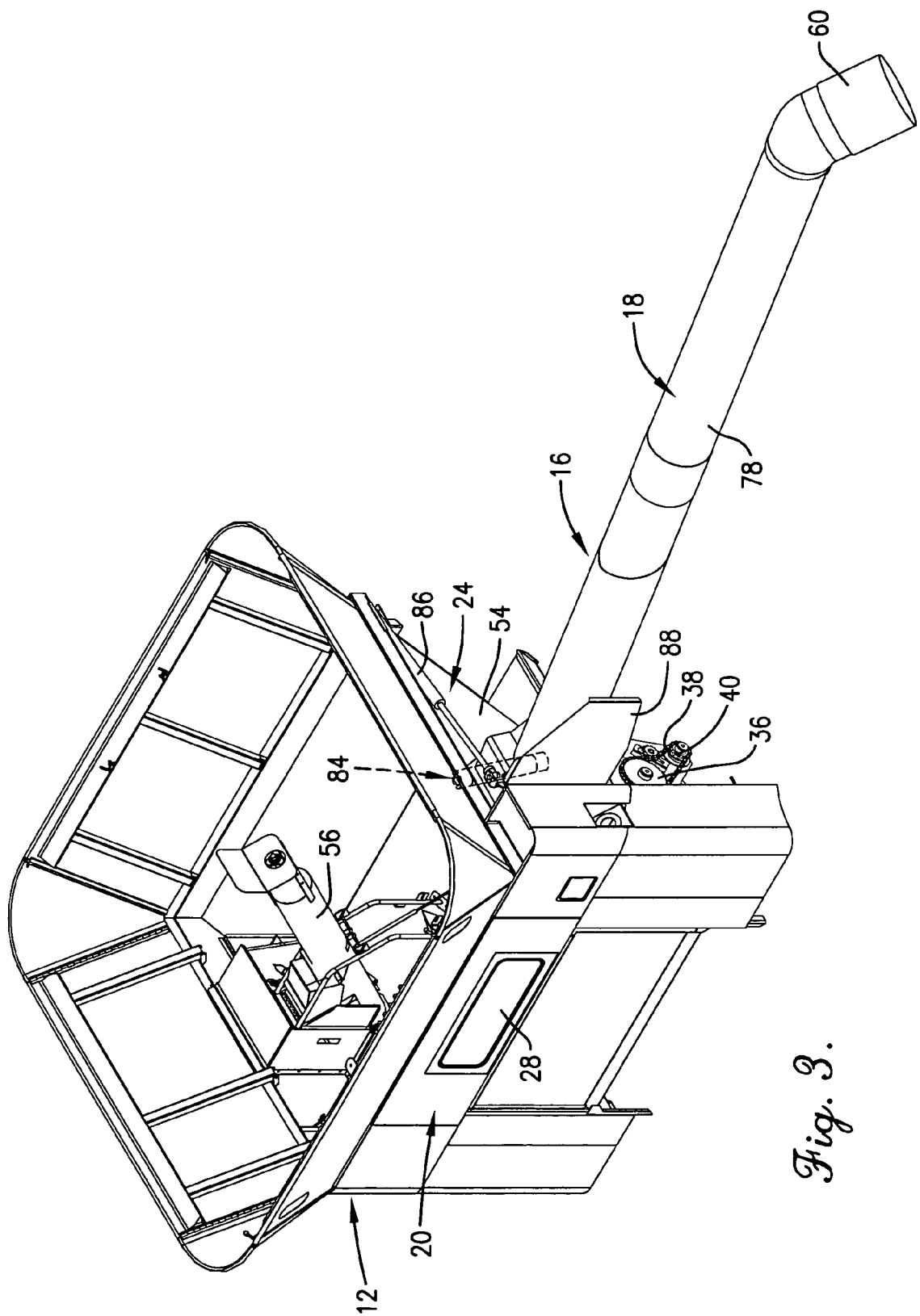
FIG. 3 is a fragmentary, left, front, top isometric view of the grain bin similar to FIG. 2 but showing the outer section of the unloading conveyor in its unloading position.
Figure 4:
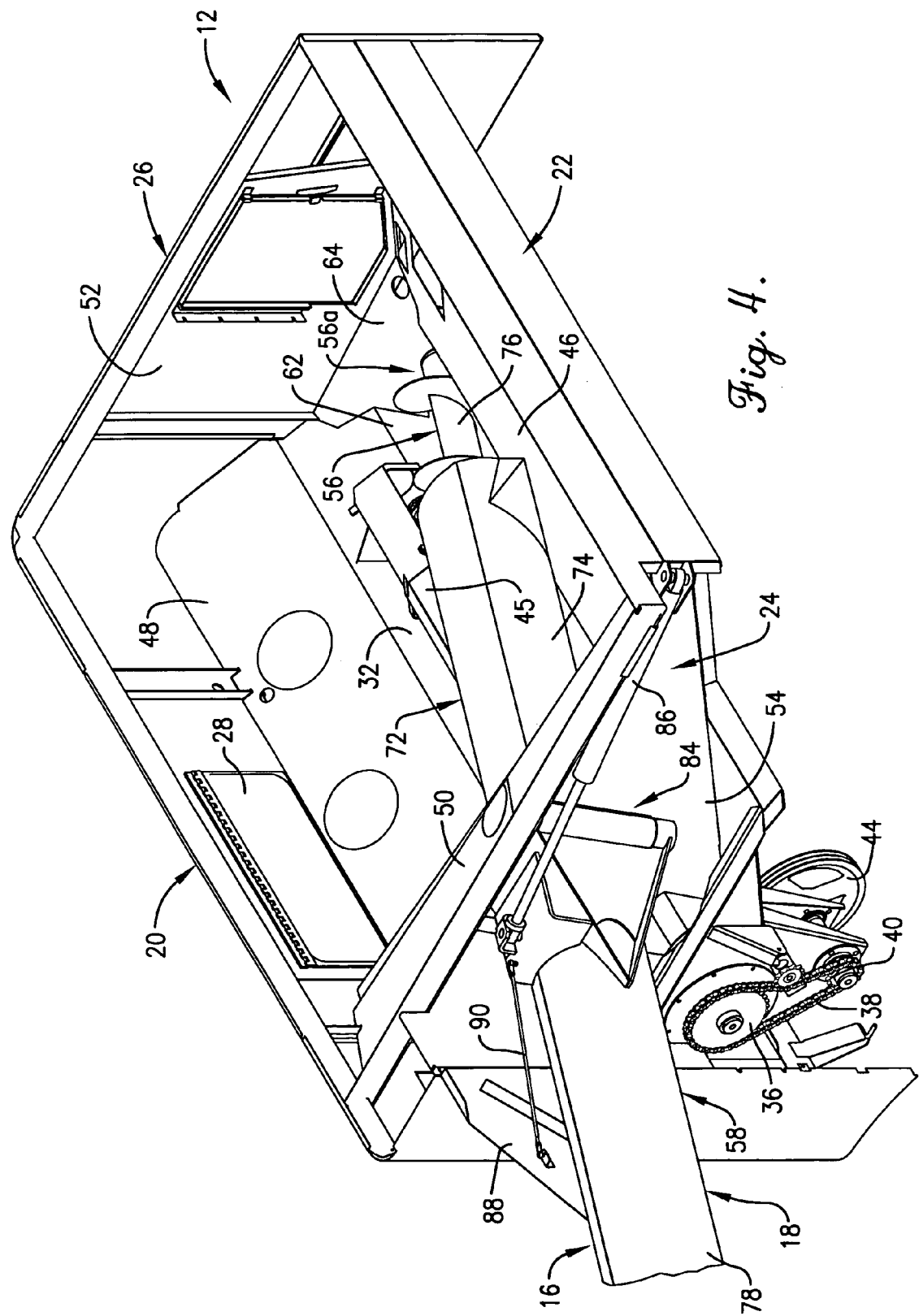
FIG. 4 is a fragmentary, enlarged, left, rear top view of the unloading bin with the outer section of the unloading conveyor in its unloading position and with the hopper-like bin extensions removed to reveal details of construction.
Figure 5:
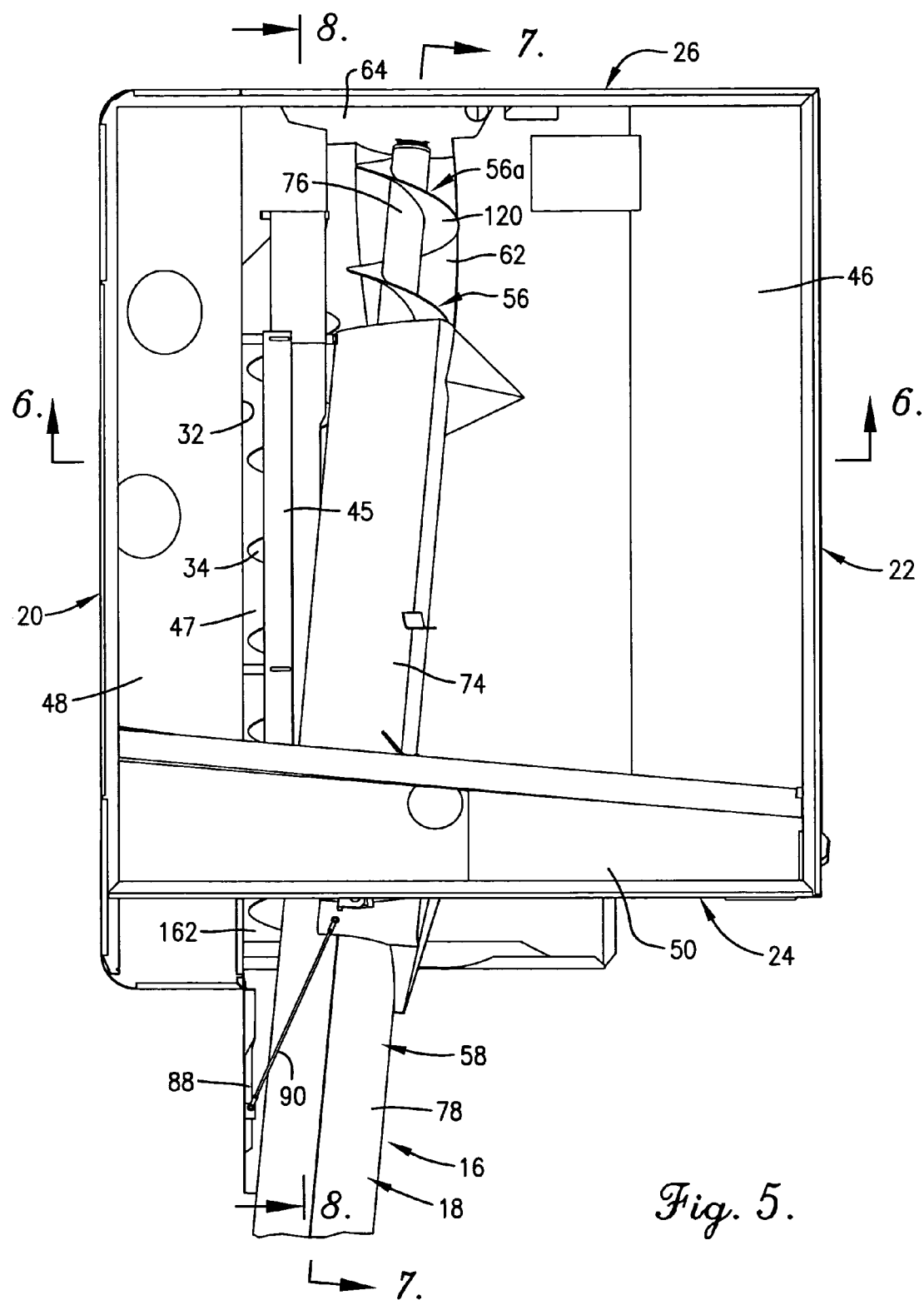
FIG. 5 is a fragmentary top plan view of the grain bin showing the outer conveyor section in its unloading position and the bin extensions removed for clarity.

Outer conveyor section 18 is rendered foldable relative to inner conveyor section 72 by a generally upright, but slightly inwardly and rearwardly inclined pivot hinge 84. Hinge 84 thus allows outer conveyor section 18 to be swung (folded) between an unloading position in which it is axially aligned with inner conveyor section 72 as illustrated in FIGS. 3, 4, 5 and 7, for example, and a transport position wherein outer section 18 extends transversely of inner section 72 and is disposed in a folded-back orientation as illustrated, for example, in FIGS. 1 and 2. A double-acting hydraulic cylinder 86 is operably coupled between left side 24 and outer conveyor section 18 for effecting such swinging motion of outer section 18 between its unloading and transport positions and for retaining outer section 18 in such positions. A door 88 is swingably attached to left side 24 in front of outer conveyor section 18 and is operated by a link 90 coupled with outer conveyor section 18 for swinging between an open position as illustrated, for example in FIGS. 3 and 4 when outer section 18 is in its unloading position, and a closed position as illustrated in FIGS. 1 and 2 when outer section 18 is in its transport position so as to visually cover the otherwise exposed open end of inner conveyor section 72. A safety interlock system (not shown) may be provided that is responsive to the position of outer conveyor section 18 so as to permit unloading auger 56 to be activated only when outer conveyor section 18 is in its unloading position.

Figure 9:
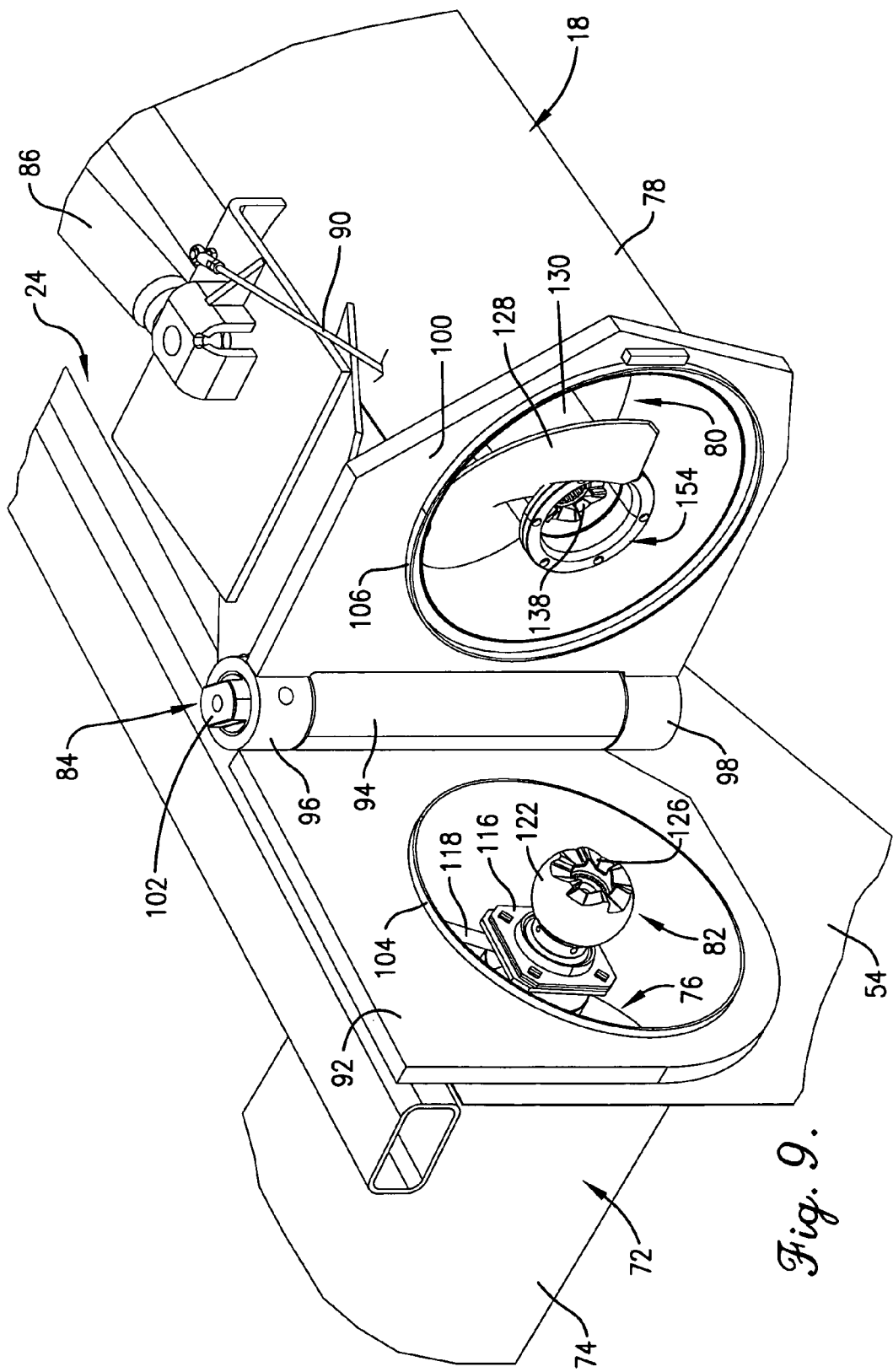
FIG. 9 is an enlarged, fragmentary isometric view of the unloading conveyor at its hinge point with the outer section thereof folded back into its transport position and illustrating the releasable drive coupling between inter-engaging ends of auger sections of the unloading conveyor.
Figure 10:
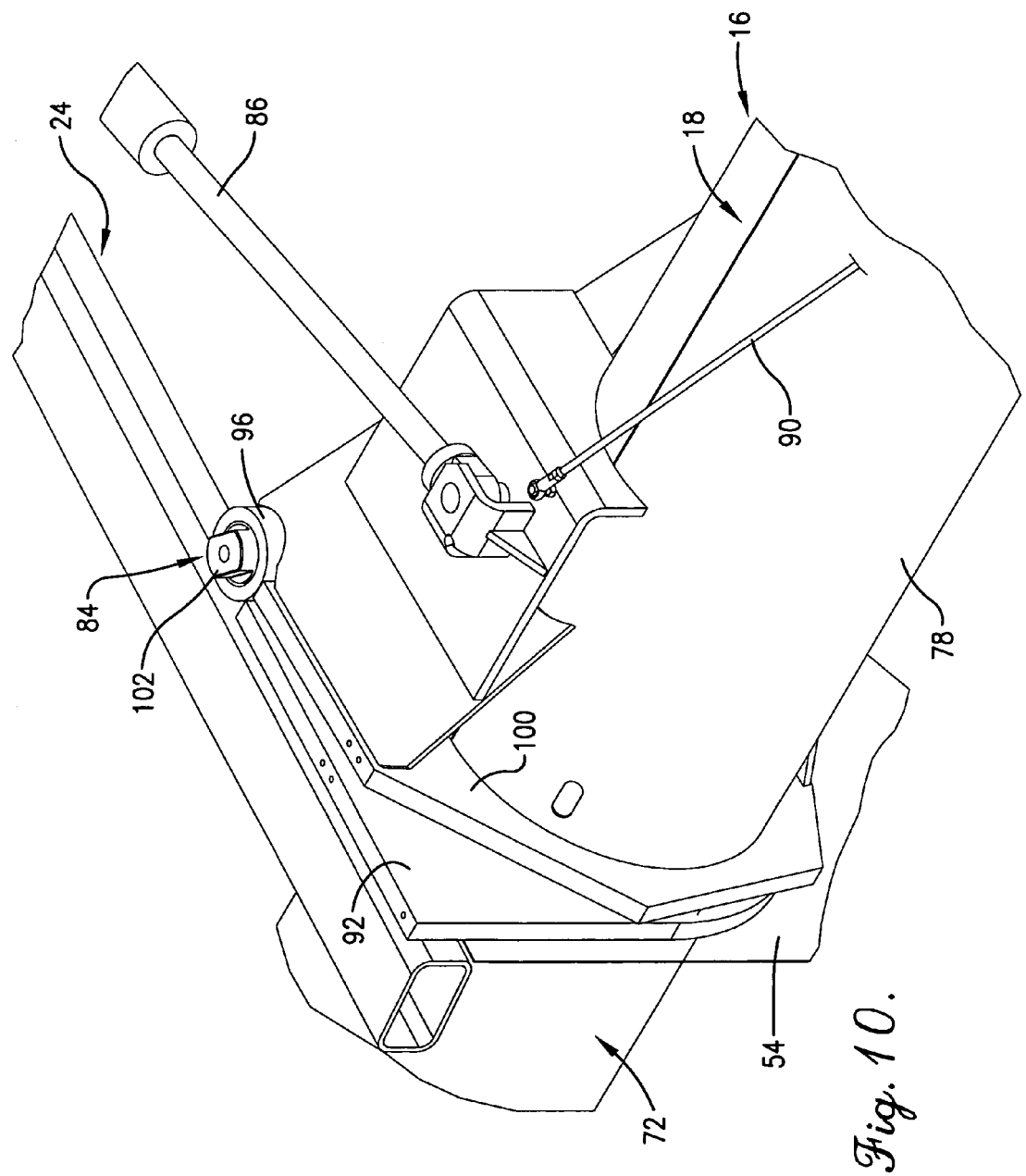
FIG. 10 is an enlarged, fragmentary isometric view of the unloading conveyor at its hinge point illustrating the outer conveyor section in its unloading position.
Figure 11:
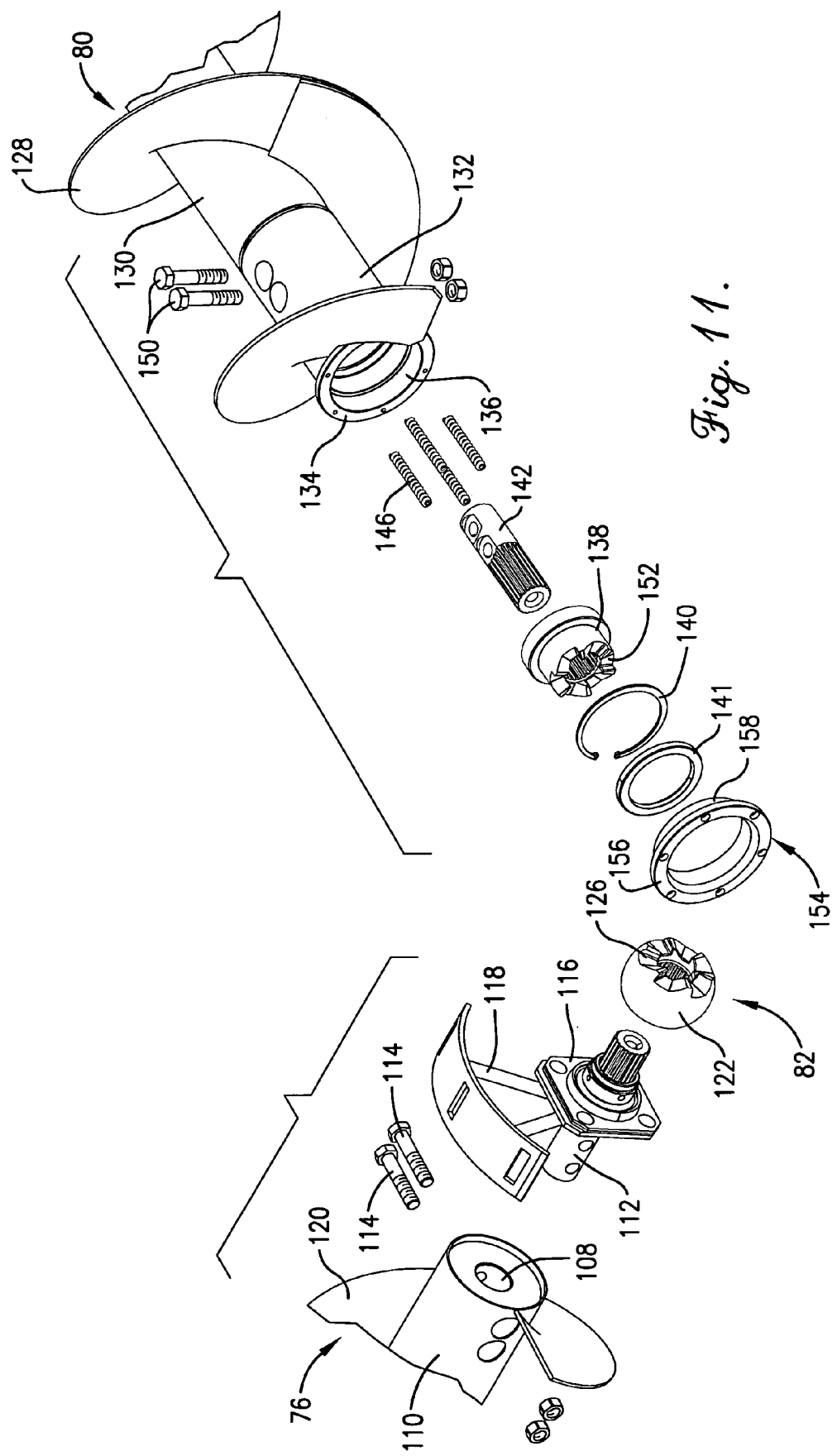
FIG. 11 is a fragmentary, exploded isometric view of the unloading conveyor with the outer section thereof in its transport position.

FIGS. 9 and 10 are enlarged views of the hinge area of the unloading conveyor 16 showing the outer conveyor section 18 in its transport and unloading positions respectively. As illustrated particularly in those views, a first hinge plate 92 is rigidly affixed to left side 24 of bin 12 and fixedly receives the outer end of inner tube section 74. A central, generally upright cylinder 94 of pivot hinge 84 is fixedly secured to plate 92, while a pair of upper and lower, shorter hinge cylinders 96 and 98 are fixedly secured to another hinge plate 100 on the proximal end of outer tube section 84. A hinge pin 102 is received by the aligned cylinders 94, 96 and 98 to maintain such cylinders in pivoting relationship with one another. A pair of internal bushings (not shown) within intermediate cylinder 94 receive hinge pin 102 to facilitate rotation of pin 102 with upper and lower cylinders 96, 98 during opening and closing of outer conveyor section 18. A sealing ring 106 on the interior face of plate 100 (FIG. 9) is slightly larger in diameter than the annular end 104 of inner tube section 74 that projects slightly beyond the interior face of plate 92 such that, when plates 92 and 100 are face-to-face when outer conveyor section 18 is closed as in FIG. 10, ring 106 and tube end 104 cooperate to form a labyrinth seal that prevents the escape of grain at the hinge point of the unloading conveyor 16.

With reference also now to FIGS. 11-14, the details of construction of drive coupling 82 will be explained. Dealing first with inner conveyor section 72, it will be seen that inner auger section 76 has an axially extending bore 108 in the outer end of its tubular shaft 110 which receives a drive shaft 112 that is held in place by a pair of transverse bolts 114. Drive shaft 112 projects outwardly beyond the end of auger shaft 110 and is journaled for rotation by bearings 116 that are supported by a hanger bracket 118 fixed to the inside surface of inner tube section 74 of inner conveyor section 72. Hanger bracket 118 thus supports the outer end of inner auger section 76 concentrically within inner tube section 74 so that flighting 120 on auger shaft 110 does not engage the interior surface of inner tube section 74. The opposite end of auger shaft 110 is rotatably supported by bearings associated with the inclined sump wall 64.

Figure 12:
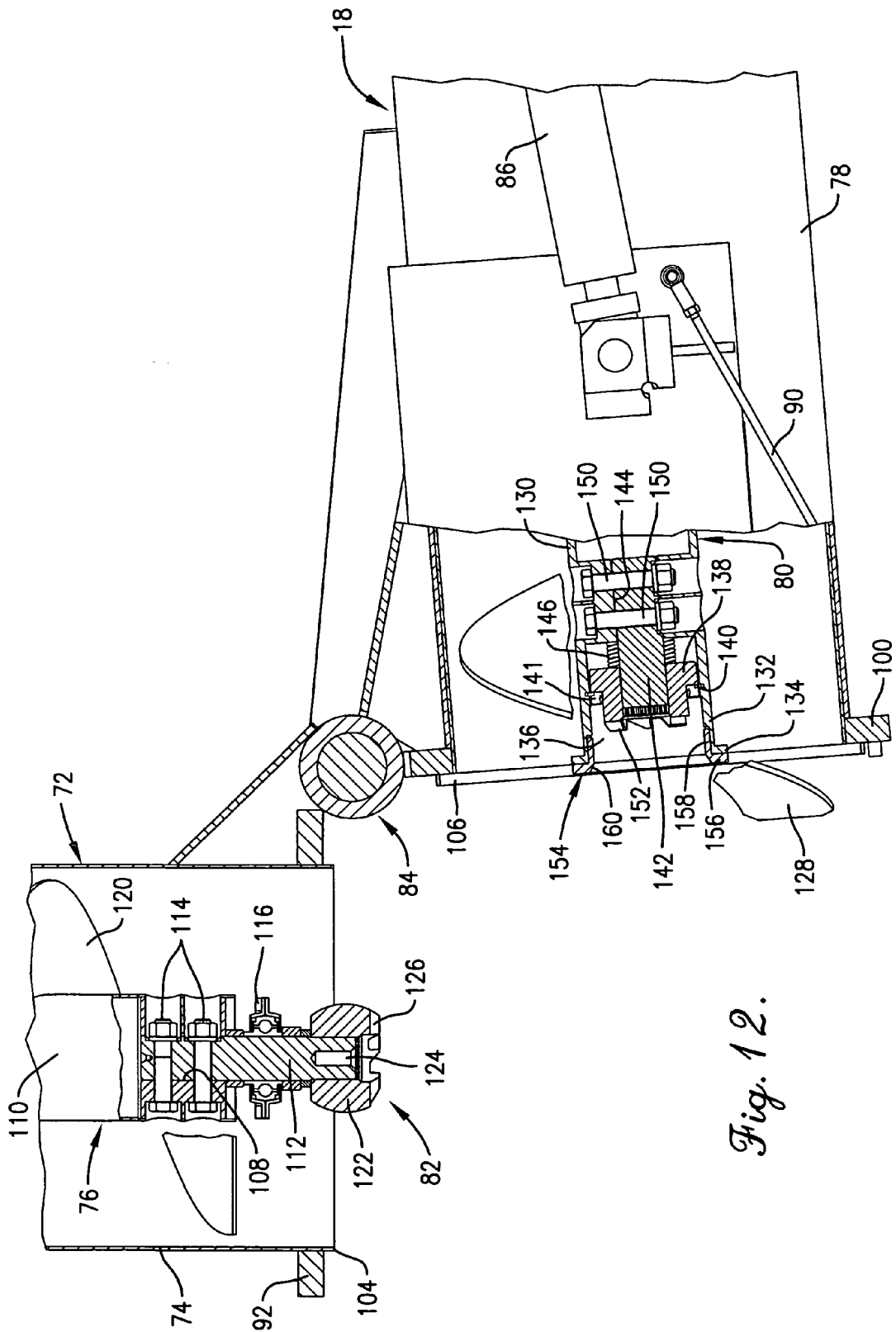
FIG. 12 is an enlarged, fragmentary top plan view of the unloading conveyor with the outer section thereof in its transport position and portions broken away to reveal internal details of construction.
Figure 13:
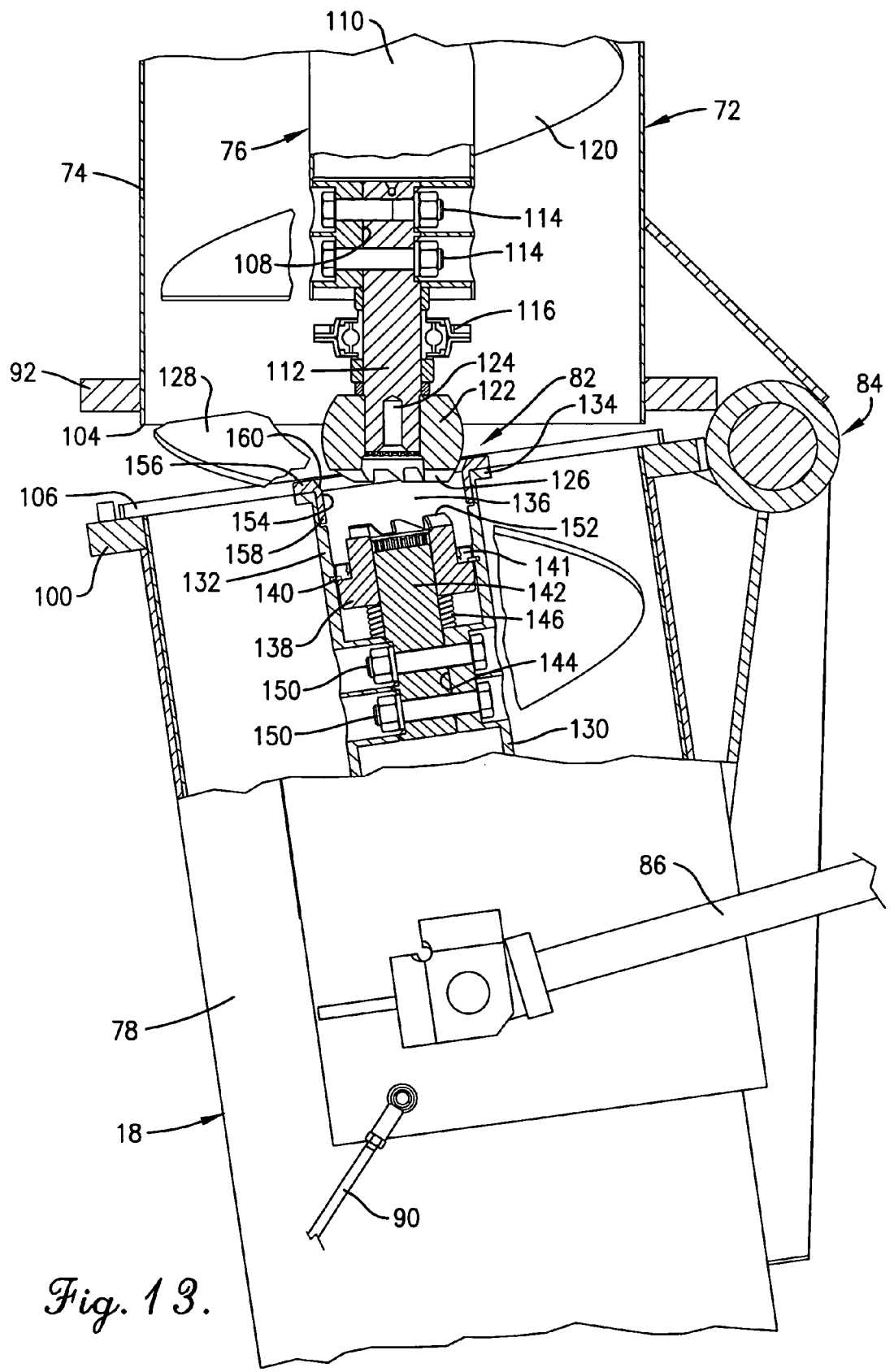
FIG. 13 is an enlarged, fragmentary top plan view of the unloading conveyor as the outer section thereof is swung toward its unloading position and the drive coupling between the two auger sections is in the process of being re-established.
Figure 14:
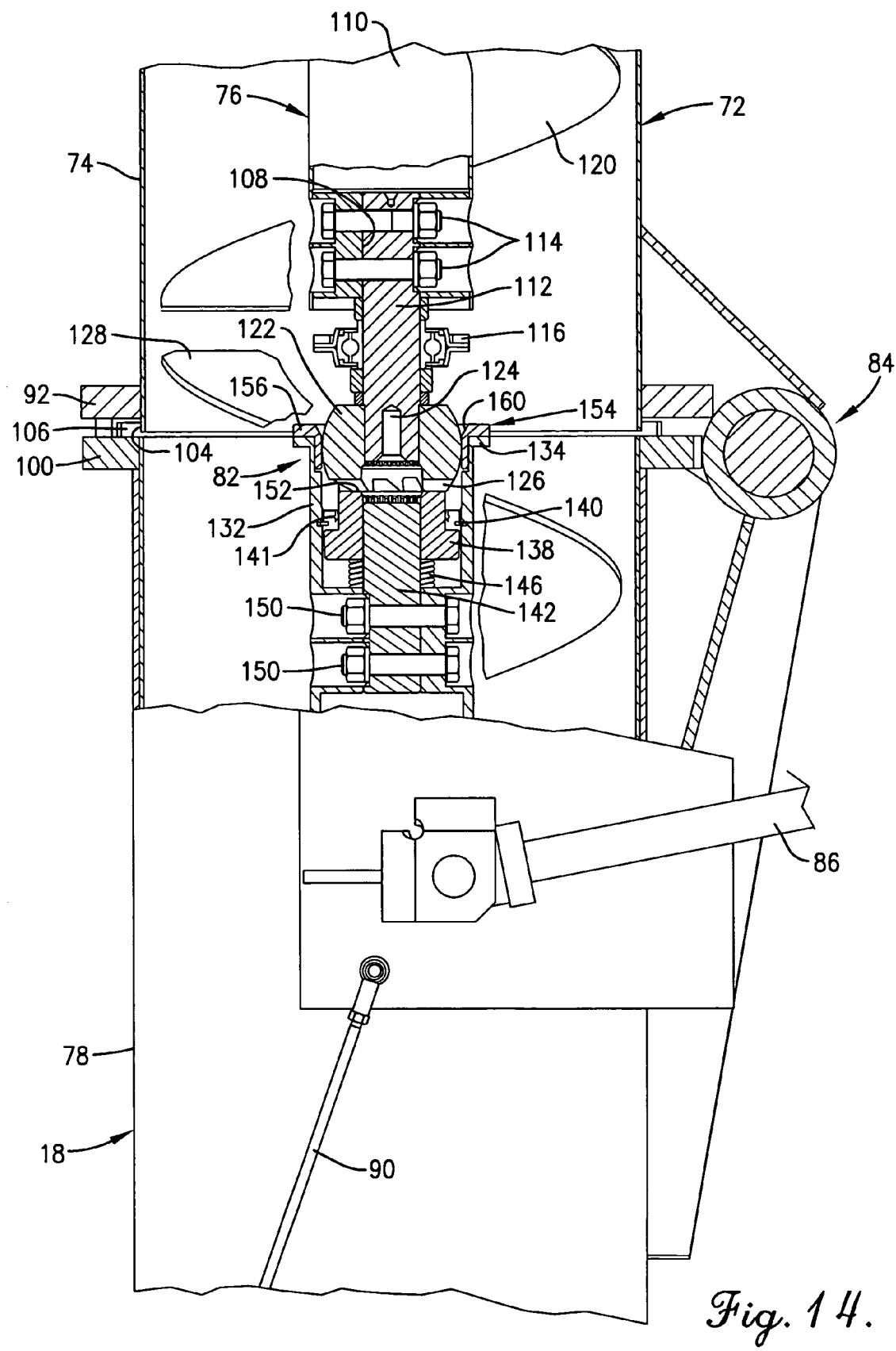
FIG. 14 is a fragmentary top plan view of the unloading conveyor similar to FIG. 13 but showing the outer section of the conveyor fully swung to its unloading position wherein the driving relationship between auger sections of the unloading conveyor is re-established.

The outer end of drive shaft 112 is splined so as to matingly receive an internally splined, generally spherical drive component 122 of drive coupling 82 (hereinafter referred to as "drive ball" 122). Drive ball 122 is secured to drive shaft 112 by suitable means such as an axially extending screw 124 (FIGS. 12, 13 and 14). The annular end face 126 of drive ball 122 is provided with drive structure in the form of a set of undercut teeth (hardened for wear resistance) that matingly engage with drive structure in the form of undercut teeth on the other major component of drive coupling 82 on outer conveyor section 18 as hereinafter described. Although drive ball 122 is herein described as being spherical, it will be seen that such component may take other shapes, such as for example, parabolic, within the concepts of the present invention. It is important, in any event, that drive ball 122 be provided with a suitably arcuate outer surface that can serve as piloting means during re-engagement of the drive between inner and outer auger sections as hereinafter explained.

Outer auger section 80 is rotatably supported at its outer end in a concentric relationship by means not illustrated, but the inner end of outer auger section 80 is not supported concentrically unless outer section 80 is engaged drivingly with inner auger section 76. Thus, when outer conveyor section 18 is in its transport position, the inner end of outer auger section 80 lies against the interior surface of outer tube section 78. Flighting 128 around the outside of tubular auger shaft 130 bears against the interior surface of outer tube section 78 at such time. It is to be noted that flighting 128 extends for a distance beyond the inner end of outer auger section 80 so as to leave only a small discontinuity in flighting along the entire length of auger 56 (in the area of hanger bracket 118) when outer conveyor section 18 is in its unloading position.

The inner end of outer auger shaft 130 is configured to present a socket 132 having an outturned lip 134. Socket 132 defines an interior chamber 136 that slidably and axially receives a second drive component 138 of drive coupling 82. Drive component 138 is recessed within chamber 136 and is retained against escape therefrom by a snap ring 140 installed in the inside wall surfaces of socket 132. An annular dust seal 141 surrounds drive component 138 generally outboard of snap ring 140.

Drive component 138 is generally annular in configuration and is internally, axially splined so as to be axially received upon the splined outer end of a drive shaft 142 within a bore 144 (FIGS. 12, 13 and 14) within the end of outer auger shaft 130. A set of compression springs 146 are contained within counterbores in socket 132 and bear against the inboard face of drive component 138 so as to yieldably bias drive component 138 outwardly toward and against snap ring 140. Drive shaft 142 is fixedly secured to auger tube 130 by transverse bolts 150.

The annular outermost face 152 of drive component 138 has driving structure in the form of a series of undercut teeth thereon configured to complementally engage with the teeth of face of 126 of drive ball 122 when outer conveyor section 18 is in its unloading position as illustrated in FIG. 14. When drive components 122 and 138 are operably engaged as illustrated in FIG. 14, drive component 138 is preferably slightly depressed away from snap ring 140 against the force of compression springs 146.

Drive coupling 82 also includes an annular, hardened guide 154 disposed at the open outer end of socket 132 in concentric relationship therewith. A flange 156 of guide 154 overlies and is secured to lip 134 by suitable fasteners not shown, while an annular wall 158 of guide 154 projects for a distance into the mouth of socket 136 and bears against the internal annular surface thereof. Guide 154 has an annular bevel 160 at the intersection of flange 156 and wall 158.

Operation

When the unloading conveyor 16 is in its unloading position, grain entering the intake end of conveyor 16 at the intake portion of 56a of auger 56 travels up a gentle slope and in a straight line from a low point near right side 26 to the discharge spout 60 without encountering elbows, bends, corners, vertical climbs, or significant breaks in auger flighting. Consequently, grain can be unloaded at a significantly higher rate of speed than conventional turret and swivel type unloaders wherein significant speed and power losses occur at various points in the unloading path of travel. In one preferred embodiment, the rise of the unloading conveyor 16 is approximately thirteen degrees.

It will be appreciated that during unloading operations, grain in bin 12 is directed to the sump 62 where it encounters the exposed intake portion 56a of auger 56. Some of the grain gravitates naturally toward sump 62 as a result of the various inclined, interior surfaces of bin 12 such as rear floor 46, front floor 48 and panel 50. In addition, cross auger 34 moves grain that has entered trough 32 through opening 47 toward the right end of trough 32 where it crosses into sump 62 and is picked up by the intake end of auger 56. This action results in a highly efficient and rapid unloading of bin 12.

During unloading operations, outer unloading section 18 is held in its unloading position by hydraulic cylinder 86. The components of drive coupling 82 are maintained in driving engagement with one another as illustrated in FIG. 14. As cylinder 86 is retracted to swing outer conveyor section 18 back to its transport position about pivot hinge 84, drive components 122 and 138 of drive coupling 82 become disconnected as illustrated in FIG. 12. During such cracking or opening of unloading conveyor 16, any leftover grain in the vicinity of drive coupling 82 can gravitate into a catch basin 162 (FIG. 8) which opens downwardly into the cross auger trough 32 for handling by cross auger 34 when unloading operations are next commenced. Once drive components 122 and 138 have been disconnected from one another, the inboard end of outer auger section 80 drops slightly within outer tube section 78 until flighting 128 comes to rest on the interior surface of outer tube section 78. Such drop of the inboard end of inner auger section 76 is on the order of ¼ inch in one preferred embodiment.

Consequently, when swing cylinder 86 is thereafter extended to return outer conveyor section 18 to its unloading position, the inboard end of outer auger section 80 will be out of alignment with inner auger section 76, which has been maintained in its concentric relationship within tube 58 by the hanger bracket 118 and its bearing supports at sump wall 64. Such mismatch is overcome, however, by the interaction of the arcuate outer cam surface of drive ball 122 and guide 154 as outer conveyor section approaches its unloading position. FIG. 13 generally illustrates this action, although the misalignment of the inboard end of outer auger section 80 is not noticeable due to the overhead viewing angle in FIG. 13. As drive ball 122 enters guide 154, the inboard end of outer auger section 80 is cammed into axial alignment until such alignment is again achieved as illustrated in FIG. 14.

As noted earlier, it is desirable for the dimensional relationships of inner and outer auger sections 76, 80 to be such that springs 146 are slightly compressed when the teeth on face 126 of drive ball 122 are fully meshed with the teeth on face 152 of drive component 138. In the event that such teeth are not perfectly enmeshed by the time unloading auger 16 is turned on, such meshing relationship will be quickly established when drive ball 122 rotates slightly relative to drive component 138. Once the proper rotative relationship is achieved, springs 146 snap drive component 138 outwardly into driving relationship with drive ball 122.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. In a combine harvester, the improvement comprising:
    a clean grain holding bin including a front, a rear, and a discharge side extending between said front and rear;
    an inclined unloading conveyor having a lower intake end disposed at a low point within the bin spaced from said discharge side and extending laterally upwardly and outwardly from said low point in a straight line and on an incline to an upper discharge end located laterally outwardly beyond the discharge side; and
    a cross conveyor in said bin operable to feed grain in a first direction generally away from said discharge side to said lower intake end of the unloading conveyor,
    said unloading conveyor being operable to move grain out of the bin in a second direction generally opposite to the first direction generally toward the discharge side of the bin and including an outer conveyor section that is foldable relative to an inner section of the conveyor from an unloading position in which the outer section is axially aligned with the inner section to a transport position in which the outer section is transverse to the inner section,
    said outer conveyor section being adapted to separate from the inner conveyor section at a point outboard of said discharge side of the bin when the outer conveyor section is folded toward said transport position,
    further comprising a catch basin disposed to receive grain spilled from the point of separation of the inner and outer sections of the unloading conveyor and to direct such spilled grain to the cross conveyor.

2. In a combine harvester as claimed in claim 1, said outer conveyor section being pivotal between said positions.

3. In a combine harvester as claimed in claim 2, said unloading conveyor including a rotatable auger, said inner section of the unloading conveyor including an inner section of the auger, said outer section of the unloading conveyor including an outer section of the auger, further comprising a releasable coupling between the auger sections permitting the auger sections to be drivingly connected to one another when the outer conveyor section is in its unloading position and drivingly disconnected from one another when the outer conveyor section is in its transport position.

4. In a combine harvester as claimed in claim 3, said coupling including a pair of interengageable components on the inner auger section and the outer auger section respectively, and a guide disposed to guide said components into axial alignment with one another as the outer conveyor section is swung into said unloading position.

5. In a combine harvester as claimed in claim 4, one of said components having a cam surface thereon, said guide being disposed to engage said cam surface as the outer conveyor section is swung into said unloading position and thereby axially align the components.

6. In a combine harvester as claimed in claim 5, said cam surface being disposed on the inner auger section and said guide being disposed on said outer auger section.

7. In a combine harvester as claimed in claim 5, said one component comprising a generally spherical body having an arcuate outer surface defining said cam surface, said guide comprising an annular member disposed to receive said body and bear against said outer surface thereof as the outer conveyor section is swung toward said unloading position.

8. In a combine harvester as claimed in claim 7, said body having an axially disposed end face provided with a first drive structure, the other of said components having an axially disposed end face provided with a second drive structure, said first and second drive structures being configured to matingly interengage when the outer conveyor section is in its unloading position.

9. In a combine harvester as claimed in claim 1, said inner conveyor section including an inner section of a rotatable auger, said outer conveyor section including an outer section of said auger, further comprising a releasable coupling between said auger sections permitting the auger sections to be drivingly connected to one another when the outer conveyor section is in its unloading position and drivingly disconnected from one another when the outer conveyor section is in its transport position.

10. In a combine harvester as claimed in claim 9, said coupling including a pair of interengageable components on the inner auger section and the outer auger section respectively, and a guide disposed to guide said components into axial alignment with one another as the outer conveyor section is swung into said unloading position.

11. In a combine harvester as claimed in claim 10, one of said components having a cam surface thereon, said guide being disposed to engage said cam surface as the outer conveyor section is swung into said unloading position and thereby axially align the components.

12. In a combine harvester as claimed in claim 11, said one component comprising a generally spherical body having an arcuate outer surface defining said cam surface, said guide comprising an annular member disposed to receive said body and bear against said outer surface thereof as the outer conveyor section is swung toward said unloading position.

13. In a combine harvester as claimed in claim 12, said body having an axially disposed end face provided with a first drive structure, the other of said components having an axially disposed end face provided with a second drive structure, said first and second drive structures being configured to matingly interengage when the outer conveyor section is in its unloading position.

* * * * *